F. A. REICHARDT.
BRUSH HOLDING RUBBER STOPPLE.

No. 180,926. Patented Aug. 8, 1876.

WITNESSES:
A. W. Almqvist
John Goethals

INVENTOR:
F. A. Reichardt
BY
Munn & Co.
ATTORNEYS.

UNITED STATES PATENT OFFICE.

FERDINAND A. REICHARDT, OF NEW YORK, N. Y.

IMPROVEMENT IN BRUSH-HOLDING RUBBER STOPPLES.

Specification forming part of Letters Patent No. 180,926, dated August 8, 1876; application filed July 11, 1876.

*To all whom it may concern:*

Figure 1:
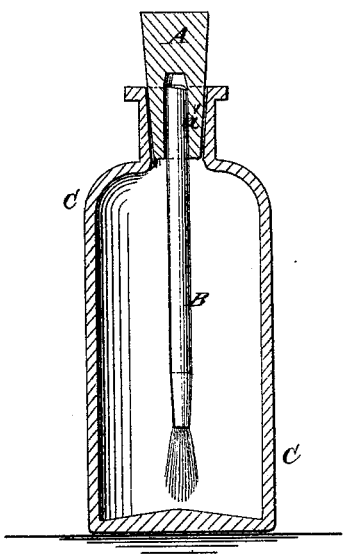
Figure 2:

Be it known that I, FERDINAND ALFRED REICHARDT, of the city, county, and State of New York, have invented a new and Improved Brush-Holding Rubber Stopple, of which the following is a specification:

Figure 1 is a longitudinal section of my improved stopple, shown as applied to a bottle. Fig. 2 is a detail longitudinal section of the stopple.

The object of this invention is to furnish improved rubber stopples for bottles, which shall be so constructed as to adapt them to serve as holders for brushes, which may thus be kept within the bottle, and may be exchanged as required.

The invention consists in a tapering rubber stopple, having its inner end perforated with a tapering hole, to receive and hold a brush-handle, as hereinafter fully described.

A represents a tapering rubber stopple, which may be made of any desired size. The lower or inner part of the stopple A has a tapering hole, $a'$, formed in it to receive the handle of a brush, B, so that when the stopple A is inserted in the mouth of a bottle, C, the brush B may be supported, and may be removed by and with said stopple. This construction allows the brush B to be detached and replaced by a larger or smaller brush, as may be required, and the elasticity of the rubber, in connection with the taper of the hole $a'$, will hold the brush-handle so firmly that it may serve as a hand-piece in using the brush, and will enable different-sized brushes to be applied to the same stopple.

Having thus described my invention, what I claim as new, and desire to secure by Letters Patent, is—

A tapering rubber stopple, A, having its inner end perforated with a tapering hole, $a'$, to receive and hold a brush-handle, substantially as herein shown and described.

FERDINAND A. REICHARDT.

Witnesses:
HERMAN ALSBERG,
CHAS. DAVIDSON.